United States Patent [19]
Åkesson

[11] 3,711,135
[45] Jan. 16, 1973

[54] QUICK COUPLING FOR CONNECTING TOGETHER CONDUCTORS, HOSES AND SIMILAR ELONGATED MEMBERS

[76] Inventor: Åke Åkesson, Vasterledstorg 3, 161 37 Bromma, Sweden

[22] Filed: Feb. 5, 1971

[21] Appl. No.: 113,008

[52] U.S. Cl. ...................................287/104, 285/70
[51] Int. Cl. ..............................................F16d 1/00
[58] Field of Search ............287/103 R, 104, 78, 65; 339/47 R, 48, 49 R, 90 R; 285/314, 70

[56] References Cited

UNITED STATES PATENTS 16,450   1/1857   Phillips..................................285/247
1,013,036  12/1911  McDonald.............................287/105
2,506,979   5/1950  Varnum..............................287/104 X

FOREIGN PATENTS OR APPLICATIONS 214,848   8/1967   Sweden..................................285/70

Primary Examiner—Andrew V. Kundrat
Attorney—Strauch, Nolan, Neale, Nies & Kurz

[57] ABSTRACT

The present invention relates to a quick coupling for connecting together conductors, hoses and similar elongated members, the coupling comprising two similar joint fittings, each of the fittings being adapted to be fastened to the end of the conductors, hoses or other elongated members.

8 Claims, 7 Drawing Figures

PATENTED JAN 16 1973

3,711,135

QUICK COUPLING FOR CONNECTING TOGETHER CONDUCTORS, HOSES AND SIMILAR ELONGATED MEMBERS

BACKGROUND OF THE INVENTION

A rather great number of such couplings are already known. However, the known devices are generally rather complicated, they take a long time to operate and they are unreliable. Further, they are easily damaged.

SUMMARY OF THE INVENTION

The present invention relates to a quick coupling which seeks to at least partly eliminate the disadvantages of hitherto known quick couplings.

The quick coupling according to the invention comprises two similar joint fittings, each comprising a connection member adapted to be connected with the end of the conductor, hose or similar elongated member, the connection member being capable of limited rotation in a locking sleeve and provided with an axial extension having partly a plane connecting surface through the axis of the connection member partly a conically shaped locking surface and an edge facet, the locking sleeve being provided with a locking projection formed by inward pressing of a part of the locking sleeve wall, the arrangement being such that in one angular end position of the locking sleeves of two joint fittings, the extensions of each of the connection members can be inserted in the open end of the locking sleeve of the other extension members so that the connecting surfaces of both extensions are brought into contact with each other, the inwards projections of each locking sleeve by such insertion being adapted to pass over the edge facet of the extension of the opposite joint fitting, and by rotating each locking sleeve to a different angular position, the inwards projection of each sleeve, is brought to catch the conical locking surface of the opposite joint fitting and by such catching to press the connecting surfaces of the two joint fittings against each other, and to prevent the joint fittings to be severed from each other.

By means of that embodiment it is possible to lock or unlock two joint fittings by rotation of the fittings in opposite directions about 90° each. The locking means can be very big within a joint fitting of usual size with the result that the locking means can transmit large power and have good resistance against damage.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

Figure 2:
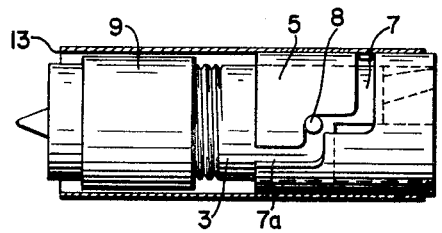
FIG. 2 is a side view of the one joint fitting of the quick coupling after removing of an external sleeve.
Figure 3:
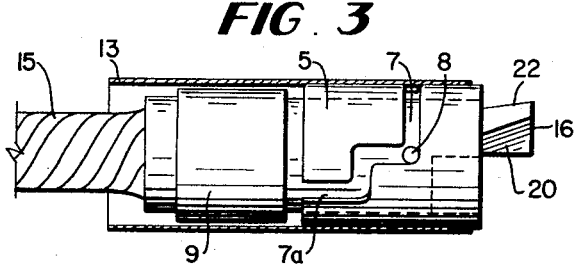
FIG. 3 is a similar view as in FIG. 2 but having a cable attached to the joint fitting.

The quick coupling according to the invention consists of two identical joint fittings 1 and 2. Each joint fitting includes a connection member 3 and 4, respectively, and a locking sleeve 5 and 6, respectively, which surrounds the associated connection member and is rotatable thereupon to a limited extent. Each locking sleeve 5 and 6 is provided, as shown in FIGS. 2 and 3, with a rectangular slot 7 having an axial portion and a peripheral portion and a pin 8, carried by the connection member 3, projects into the slot 7. The function thereof will be explained later.

Both connection members 3 and 4 have a threaded end 3' and 4' each carrying a clamping nut 9 and 10, respectively, cooperating with a conical plug 11 and 12, respectively. A protection sleeve 13 surrounds and is fixed to the locking sleeve 5 and a protection sleeve 14 surrounds and is fixed to the locking sleeve 6. The protection sleeves 13 and 14 also surround the clamping nuts 9 and 10 with a close free fit leaving a little space.

As shown in FIG. 2 the connection member 3 has been pushed to the left in the locking sleeve 5 and the pin 8 is resting at the bottom of the axial portion of the slot 7. The clamping nut 9 too is pushed to the left so that it has been possible to place a screw-key on the end of the nut and to screw off the nut 9. Thereafter an end of an electric cable 15 can be put into the nut 9 and attached thereto by means of the conical plug 11. Then the nut 9 is screwed upon the connection member end 3' and the plug 11 will be harder pressed against the cable leads. FIG. 3 shows the cable 15 connected to the clamping nut 9 and connection member 3 and those parts have been pushed to the right in the locking sleeve 5 so that the pin 8 is in front of the peripheral portion of the slot 7.

As illustrated, the axial part of the slot 7 is provided with an offset extension 72. By means of this arrangement, the sleeve 5 may be pushed on to the connection member from the outer end of the same and, by rotating a small angle, brought to the position shown in FIG. 2.

Figure 1:
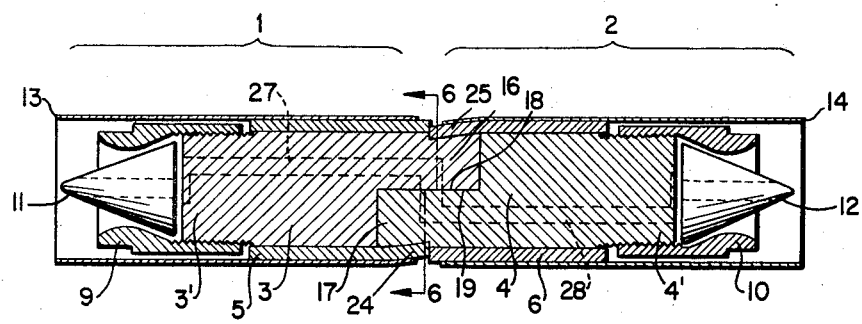
FIG. 1 is a longitudinal section of a quick coupling containing two joint fittings constructed in accordance with the present invention.
Figure 6:
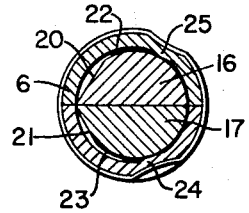
FIG. 6 is a cross section of the coupling according to FIG. 1 along the line VI—VI of said FIG. 1.

Each connection member 3 and 4 has an extension 16 and 17, respectively. The extension 16 is provided with a plane connecting surface 18 located diametrically to said connection member 3 through the axis thereof. The extension 17 is provided with a similar plane connecting surface 19. Surfaces 18 and 19 are adapted to rest against each other. Further, the extensions 16 and 17 each is provided with a facet 20 and 21, respectively, obtained by removing an edge of each extension 16 and 17. Moreover, each extension 16 and 17 is provided with an external locking surface 22 and 23, respectively, which surface is conically shaped with slightly increasing radius as well against the outer end surface of the extension as from the facet 20 or 21 to the other edge of the extension as may be obvious from FIGS. 1, 3 and 6. Each locking sleeve 5 and 6 has a locking projection 24 and 25 produced by bending a wall portion of the locking sleeve inward.

Figure 4:
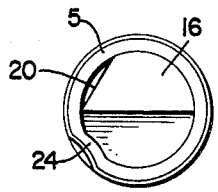
FIGS. 4 and 5 are end views of two joint fittings adapted to be connected.
Figure 5:
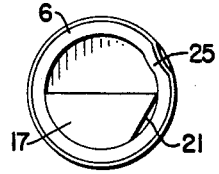

It is supposed that two identical joint fittings 1 and 2 are constructed as here described and that each is connected with an electric cable and the pin 8 has the position in the slot 7 as shown in FIG. 3. Shown in FIGS. 4 and 5 the two joint fittings 1 and 2 are ready for coupling together. Joint fittings 1 and 2 are turned 90° and their front surfaces will be directed against each other. Thereafter, the joint fittings are moved together whereby the plane surfaces slide against each other, the locking projection 25 enters the facet 20, the locking projection 24 enters the facet 21 and finally the end surfaces of the locking sleeves 5 and 6 to the position shown in FIG. 6 and as the connecting surfaces 18 and 19 are lying against each other and each pin 8 has been moved into the peripheral portion of each slot 7 then the locking projections 24 and 25 are in firm grasp with the locking surfaces 22 and 23 and no axial drawing can separate the joint fittings until they are turned back to the starting position with the locking projections 24 and 25 close to the facets 20 and 21.

Figure 7:
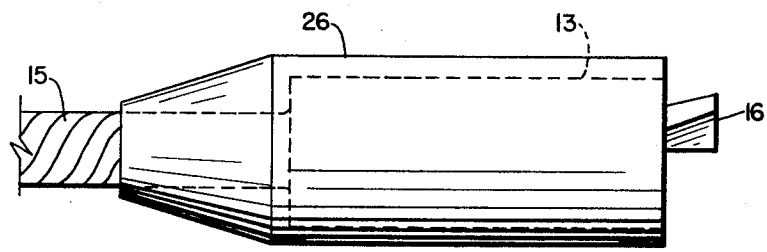
FIG. 7 is a view of the joint fitting according to FIG. 3 and provided with a covering sleeve.

In FIG. 7 there is illustrated one of the joint fittings with a part of a cable 15 fixed thereto as shown in FIG. 3. The protection sleeve 13 is surrounded by a rubber or plastic covering 26 that is suited to the sleeve 13 in such a way that a rotating of the rubber covering 26 always will cause the same rotating of the protection sleeve 13 and the locking sleeve 5 in relation to the connection member 3. In mounting the rubber covering it may be suitable to put the covering on the cable and then to fasten the cable to the joint fitting and finally to displace the covering axially to the position shown in FIG. 7 whereby the covering 26 surrounds the cable 15 hermetically.

It may hereafter be obvious that the joint fitting according to the invention consists of strong parts able to transmit considerable axial load. The joint fittings are easily locked by putting two joint fittings together end against end and rotating the locking sleeves, i.e., the coverings 26, if they exist, about 90° each. For unlocking, rotation of the locking sleeves is performed in the opposite direction, from that just described, and the joint fittings are drawn apart.

Though the quick coupling has been described in connection with electric cable, there is, of course, nothing to prevent use of the quick coupling for connection of hoses or combined conductors and hoses for simultaneous transmitting of electric current and a fluid. For that reason the conical plug 11 and the connection member 3 may be provided with a channel 27 and the plug 12 and the connection member 4 may be provided with a channel 28 as shown with dash and dotted lines in FIG. 1. For the same purpose it is also possible to replace the clamping nuts 9 and 10 by a short threaded tube inserted in the ends of the hoses and intended to be screwed on the ends 3' and 4' of the connection members 3 and 4 which may be provided with suitably arranged axial channels. In such a construction it is not necessary that the connection members 3 and 4 are axially displaceable in their locking sleeves 5 and 6 as said short tubes may reach outside the protection sleeves 13 and be rotatable by a tool.

Also other modifications than described in the foregoing may be made within the scope of the appended claims.

What is claimed and desired to be secured by Letters Patent is:

1. A quick coupling for connection of conductors, hoses and similar elongated members, said coupling comprising two similar joint fittings each comprising a connection member adapted to be connected with the end of the conductor, hose or similar elongated member, said connection member being capable of limited rotation in a locking sleeve and provided with an axial extension having on one side a planar connecting surface through the axis of the connection member, a conically shaped surface defined peripherally about the other side of the outer surface of said axial extension and extending axially therealong from adjacent the free end of said axial extension to a point spaced from the opposite end thereof and an edge facet formed on said conically shaped surface, said locking sleeve being provided with an inwardly directed locking projection, the arrangement being such that in one angular end position of the locking sleeves of two joint fittings, said extensions of each of said connection members can be inserted in the open end of the locking sleeve of the other extension members so that the connecting surfaces of both extensions are brought into contact with each other, the inwards projection of each locking sleeve by such insertion being adapted to pass over the edge facet of the extension of the opposite joint fitting and by rotating each locking sleeve to a different angular position, said inwards projection of each sleeve is brought to catch the conical locking surface of the opposite joint fitting and by such catching to press the connecting surfaces of the two joint fittings against each other, and to prevent the joint fittings being severed from each other.

2. A quick coupling according to claim 1, wherein said conically shaped locking surface of the extension has increasing radius peripherally from the facet and axially from a point on the extension, whereby the connection members are kept pressed against each other in radial and axial directions, when the locking surface of each joint fitting cooperates with an inwards projections of the opposite joint fitting.

3. A quick coupling according to claim 1, wherein said locking sleeve has a slot, said slot having an axial portion and a peripheral portion, said connection member having a pin movable in said slot portions, thereby limiting axial displacement and rotation of said locking sleeve.

4. A quick coupling according to claim 3, wherein the axial portion of said slot has an offset continuation which is open at one end of the sleeve, whereby said sleeve can be pushed on to said connection member with said pin in place.

5. A quick coupling according to claim 1, wherein each connection member beyond said locking sleeve has a threaded end for cooperation with a clamping nut provided with a conical plug for attachment to the end of a multicore conductor.

6. A quick coupling according to claim 5 wherein the conical plug and the connection member are provided with a channel.

7. A quick coupling according to claim 1, wherein each connection member beyond said locking sleeve has a threaded end for cooperation with an internally threaded tube piece or the like for connection to a hose or the like and the connection member has an axial channel extending from the end surface of said threaded end to the other end of the connection member.

8. A quick coupling according to claim 1, wherein said locking sleeve and said connection member are surrounded by a protection sleeve fastened to said locking sleeve.

* * * * *